(12) United States Patent
Tommasini

(10) Patent No.: US 10,704,833 B2
(45) Date of Patent: Jul. 7, 2020

(54) LIGHT CURING DEVICE

(71) Applicant: Ivoclar Vivadent AG, Schaan (LI)

(72) Inventor: Dario Tommasini, Mastrils (CH)

(73) Assignee: Ivoclar Vivadent AG, Schaan (LI)

( * ) Notice: Subject to any disclaimer, the term of this patent is extended or adjusted under 35 U.S.C. 154(b) by 240 days.

(21) Appl. No.: 15/533,817

(22) PCT Filed: Jun. 17, 2016

(86) PCT No.: PCT/EP2016/064024
§ 371 (c)(1),
(2) Date: Jun. 7, 2017

(87) PCT Pub. No.: WO2016/202991
PCT Pub. Date: Dec. 22, 2016

(65) Prior Publication Data
US 2017/0370642 A1    Dec. 28, 2017

(30) Foreign Application Priority Data

Jun. 17, 2015  (EP) ..................................... 15172603

(51) Int. Cl.
*A61C 13/15*   (2006.01)
*F26B 3/28*    (2006.01)
*A61C 1/00*    (2006.01)

(52) U.S. Cl.
CPC .............. *F26B 3/28* (2013.01); *A61C 19/004* (2013.01); *A61C 1/0015* (2013.01)

(58) Field of Classification Search
CPC ........ F26B 3/28; A61C 1/0015; A61C 19/004
(Continued)

(56) References Cited

U.S. PATENT DOCUMENTS

| 2004/0214138 A1* | 10/2004 | Senn ................... A61C 19/004 433/141 |
| 2007/0259309 A1* | 11/2007 | West .................... A61C 19/004 433/29 |

(Continued)

FOREIGN PATENT DOCUMENTS

| CN | 1182575 A | 5/1998 |
| CN | 1970278 A | 5/2007 |

(Continued)

*Primary Examiner* — Matthew M Nelson
(74) *Attorney, Agent, or Firm* — Ann M. Knab; Thad McMurray

(57) ABSTRACT

The invention comprises a light curing device with a light source (30) and a light guiding device, in particular a light guiding rod (18) with a light entry surface (31) that extends next to the light source (30) if regarded in the emission direction of the light source (30), and with at least one sensor (36) that is arranged next to the light entry surface (31), and with a control device (32) that is arranged within a handpiece (14) of the light curing device (10). The light curing device (10) further comprises a base station (12) of the light curing device (10). The base station (12) is provided with a second light source (24) and a second light sensor (26) for the bidirectional optical communication with the handpiece (14), which bidirectional communication takes place through the light guiding device (light guiding rod), in particular in the frequency range of visible light or UV light and in particular in a modulated manner.

21 Claims, 2 Drawing Sheets

(58) Field of Classification Search
USPC .......................................................... 433/29
See application file for complete search history.

(56) References Cited

U.S. PATENT DOCUMENTS

| | | | |
|---|---|---|---|
| 2008/0026339 A1* | 1/2008 | Plank | A61C 19/004 |
| | | | 433/29 |
| 2009/0098504 A1* | 4/2009 | Hourmand | A61C 19/043 |
| | | | 433/72 |
| 2014/0186792 A1* | 7/2014 | Rose | A61C 1/0015 |
| | | | 433/29 |
| 2014/0272789 A1* | 9/2014 | Mozes | A61C 8/0092 |
| | | | 433/173 |
| 2015/0169845 A1* | 6/2015 | Bradley | A61B 5/4818 |
| | | | 705/2 |
| 2016/0074144 A1* | 3/2016 | Peterson | A61C 19/003 |
| | | | 433/29 |
| 2017/0251954 A1* | 9/2017 | Lotan | A61C 1/052 |

FOREIGN PATENT DOCUMENTS

| | | | |
|---|---|---|---|
| CN | 102259477 A | 11/2011 | |
| CN | 2014285303 U | 7/2014 | |
| DE | 102014224026 A1 | 5/2015 | |
| FR | 2805148 A1 | 8/2001 | |

\* cited by examiner

LIGHT CURING DEVICE

CROSS-REFERENCE TO RELATED APPLICATIONS

This application is a National Stage application of International patent application PCT/EP2016/064024 filed on Jun. 17, 2016, which claims priority to European patent application No. 15172603.1 filed on Jun. 17, 2015, the disclosures of which are incorporated herein by reference in their entirety.

TECHNICAL FIELD

The invention relates to a light curing device according to the preamble of claim 1.

BACKGROUND

It has been known for long that light curing devices consisting each of one handpiece and one base station, have to be calibrated, as the optical system of the light curing device as provided in the handpiece, may comprise certain manufacturing spreads.

This includes both the light source that mostly consists of a plurality of LED chips that are arranged next to one another and collectively emit light, and also the light guiding rod, but also a converging lens provided between the LED chips and the light guiding rod, or an additional attachment that is provided at the front end of the light guiding rod.

Light guiding rods are often interchangeable in order to enable a sterilization by autoclave, and each light guiding rod comprises a special transmission characteristic, with the consequence that also in this regard certain manufacturing spreads are present.

In order to achieve a constant light curing result, light curing devices therefore must be calibrated and parameterized.

On the other hand, only a limited space is available for the operating elements at the handpiece. In case of pistol-shaped light curing devices, but also in case of rod-shaped light curing devices and their handpieces, usually a trigger button is provided, and an additional operating function may be provided by pressing longer or repeatedly pressing briefly the trigger button.

Moreover, a display element in the form of a LCD display that is spatially quite limited, is provided that provides specific basic information to the user, and, where appropriate, also display LEDs are provided that visualize the light curing operation.

For the transmission of information between the light curing device and the associated base stations it is provided according to DE 103 19 010 B4 to provide the charging plug-in contacts for charging the accumulator of the handpiece, or, if applicable, additional contacts via which information between the light curing device and the handpiece can be transmitted.

This kind of data transmission is basically well suited for handpieces in pistol-shape. In case of handpieces having the shape of pins, the charging contacts are usually disposed at the lower side of the handpiece, and are to abut on the corresponding counter contacts at the charging tray of the base station. This quite free bearing indeed enables a quite reliable charging operation, even if short-term interruptions of the contact occur in the case of vibrations of the base station; those do not impair the charging cycle.

However, there may arise disruptions with the data transmission that—without respective plausibility checks etc.— may affect the reliability of the calibration and parameterization of the handpiece.

In contrast thereto, the invention is based on the object of providing a light curing device according to the preamble of claim 1, which light curing device may be reliably calibrated and/or parameterized, in particular if it is present in pin shape.

SUMMARY

This object is inventively solved by claim 1. Advantageous further developments emerge from the subclaims.

According to the invention it is especially favorable that due to the bidirectional optical communication there is provided an interference immunity to contact difficulties. It is particularly favorable that the light source used for the light curing operation, which light source emits light in a main wavelength range, at the same time is used as a transmission medium, in order to enable a reliable transmission to a light sensor at the base station. It is preferred that the light source is equipped with LED chips, wherein, however, laser diodes alternatively may also be used.

The emitted signal is modulated as a carrier signal for the transmission of information, either per frequency modulation, amplitude modulation or pulse width modulation. In this configuration it is provided that the communication based on said carrier signal is effected bidirectionally, wherein in particular two carrier signals of different frequency are used.

Thus, a considerable signal-to-noise ratio of the signal transmission is ensured, especially with regard to the quite strong light source. The bidirectional communication requires a corresponding light source at the base station, together with a sensor in the handpiece that may also be used for other purposes. The light source at the base station can be configured to be less strong than the light source in the handpiece, for example by three quarters, the more so as in a favorable configuration a guidance for the front end of the light guiding rod of the handpiece may be provided which guidance ensures that the front end is arranged at the most favorable transmission location, i.e. for example shortly above the base station light source, when the bidirectional communication takes place.

According to the invention it is especially favorable that with the aid of the bidirectional communication that also quickly can take place automatically when inserting the handpiece in the charging tray of the base station, an adjustment and a synchronization, if necessary, between the base station and the handpiece may take place. In particular parameters less often required, can only be stored in the base station for the respective handpiece so that they are available on demand and may changed or retrieved, respectively, via the operating element of the handpiece.

In a further advantageous configuration it is provided that the base station is equipped with an additional manually operable operating element, for example with a trigger button. Upon actuation of the trigger button, a switchover to a programming mode and/or a calibration mode takes place so that for example new exposure times may be programmed, the number of charging cycles of the accumulator of the handpiece may be checked, or its efficiency may be determined by a short test run thereby determining DU:Dt at a given current value I.

A further possibility for the function assignment of the additional operating element is for example to communicate to the handpiece that the light guiding rod has been changed. The handpiece can then automatically switched over to a calibration mode, with the aid of which the second sensor automatically detects the light emission via the first light source and sets a nominal power as a set power.

Moreover, it is possible in this mode to detect a possible contamination of the front end of the light guiding rod—or dust on the rearward end thereof, which results in a decrease of the light power. Also, possibly present cracks of the light guiding rod may be detected that result in a decrease of the light power.

In this respect, a special feature of the inventive light curing device is that the second sensor is adjusted to the nominal power of the first light source and in this regard in an advantageous design is both sensitive in the analog range, that is it can detect the exactly given light power, and also is sufficiently quick in order to detect a modulated signal according to the modulation for the data transfer. As the amount of data to be transferred is limited—no pictures have to be transmitted—usually a cutoff frequency of the system light source/light sensor, inclusive of the associated drive and evaluation circuits, is sufficient, which cutoff frequency permits a data rate of 100 KB/s. Thus, comparably cheap components may be used.

In a further advantageous design it is provided to connect the base station with an internet connection. It is preferred to then install an antivirus program in the control device of the base station that may be regularly updated via the internet connection.

It is also possible to then readily update further software modules, and it is also possible to have the handpiece checked by the base station for service purposes, for example in order to carry out a required maintenance or to order a replacement or spare part.

In a further modified configuration of the base station, said base station comprises a display device in the form of a LCD display which may be operated via suitable operating elements such as via a touch-sensitive screen, and which may perform any control functions suitable therefor.

In this connection, the fact ma be favorably exploited that the housing of the base station is usually larger than the housing of the handpiece such that there is more space available for an ergonomically favorable operation.

It is to be understood that in this configuration also a programming of the handpiece via the operating unit at the base station is possible, the data to be transferred then being exchanged via the inventive bidirectional optical communication with the handpiece.

BRIEF DESCRIPTION OF THE DRAWINGS

Further advantages, details and features emerge from the following description of an exemplary embodiment of the invention in connection with the drawings, in which.

DETAILED DESCRIPTION

Figure 1:
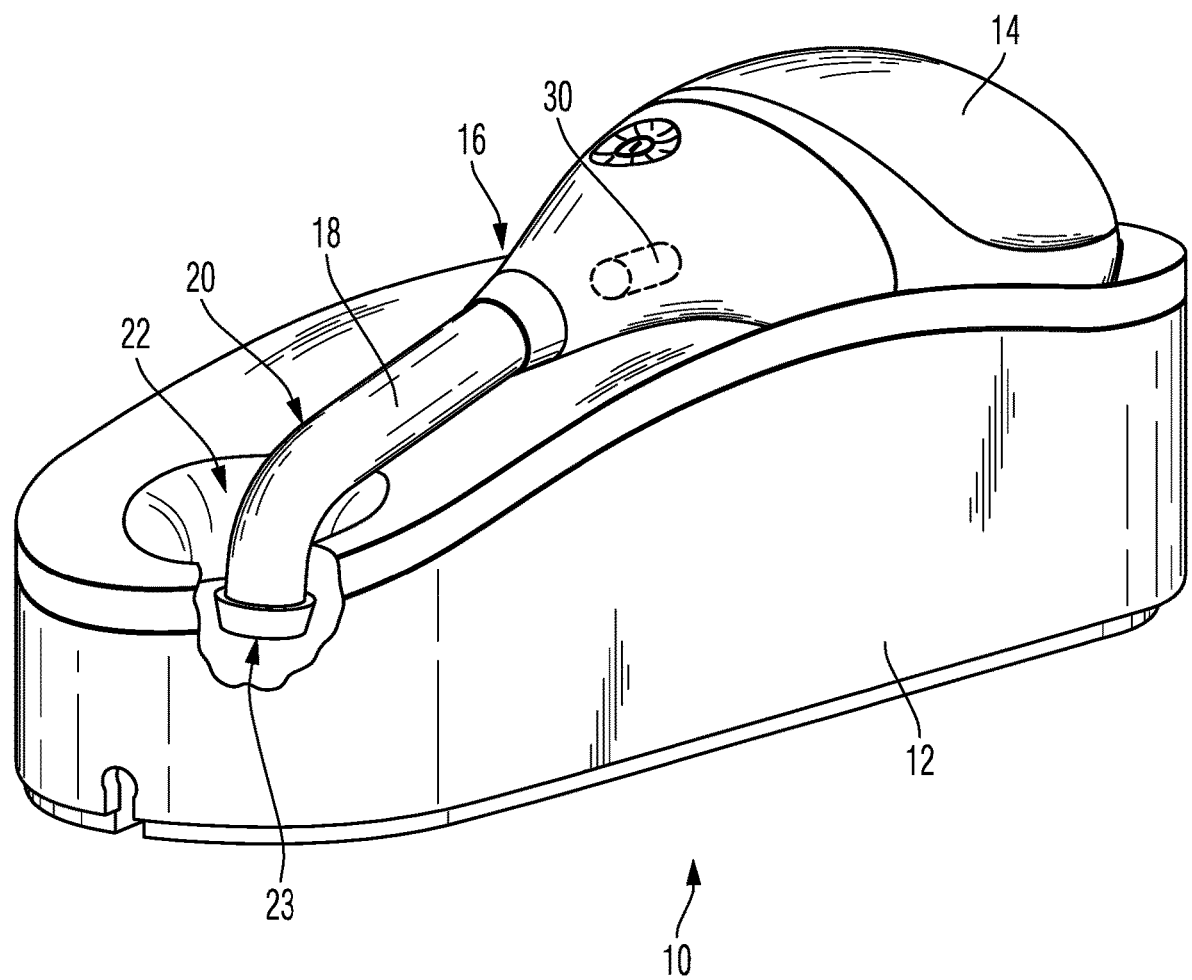
FIG. 1 shows a perspective schematic view of an embodiment of an inventive light curing device.

From FIG. 1 it becomes apparent in which way an inventive light curing device 10 may basically be built from one base station 12 and one handpiece 14. In the illustrated exemplary embodiment, the handpiece 14 is arranged in a charging tray 16 of the base station 12. It basically has pin-shape, but it is readily possible to use instead a pistol-shaped handpiece with an accordingly adapted charging tray that allows the optical communication between the front end 20 of the light guiding rod 18 and the light sources and light sensors in the base station 12.

It is particularly favorable if the handpiece 14 that always comprises a light guiding rod 18 or another suitable light guiding element, is arranged in the base station 12 in the charging position such that the front end 20 of the light guiding rod 18 enters a recess 22 that is arranged within or at the base station 12.

Within the recess 22, a second light source 24 and a second light sensor 26 are provided in addition to the first light sensor arranged in the handpiece and the first light source arranged in the handpiece below a cover not illustrated. The second light source 24 and the second light sensor 26 are immediately adjacent to the light exit area 23 of the front end 20 of the light guiding rod 18 in the idle state of the handpiece 14 on the base station 12. The radiation of the main light source 30 of the handpiece 14 impinges on the second light sensor 26, and the second light source 24 of the base station emits light in such a manner that it to a large extent radiates on the first light sensor that is arranged within the handpiece 14.

Due to the arrangement of the end 20 in the recess 22, the communication is shielded from extraneous light for the most part. Moreover, the bidirectional communication takes place via pulsed signals, for example via a carrier frequency signal, and only the alternating voltage part of the electrical signal emitted from the light sensor is evaluated. Alternatively, the communication can also take place via non-modulated light.

Figure 2:
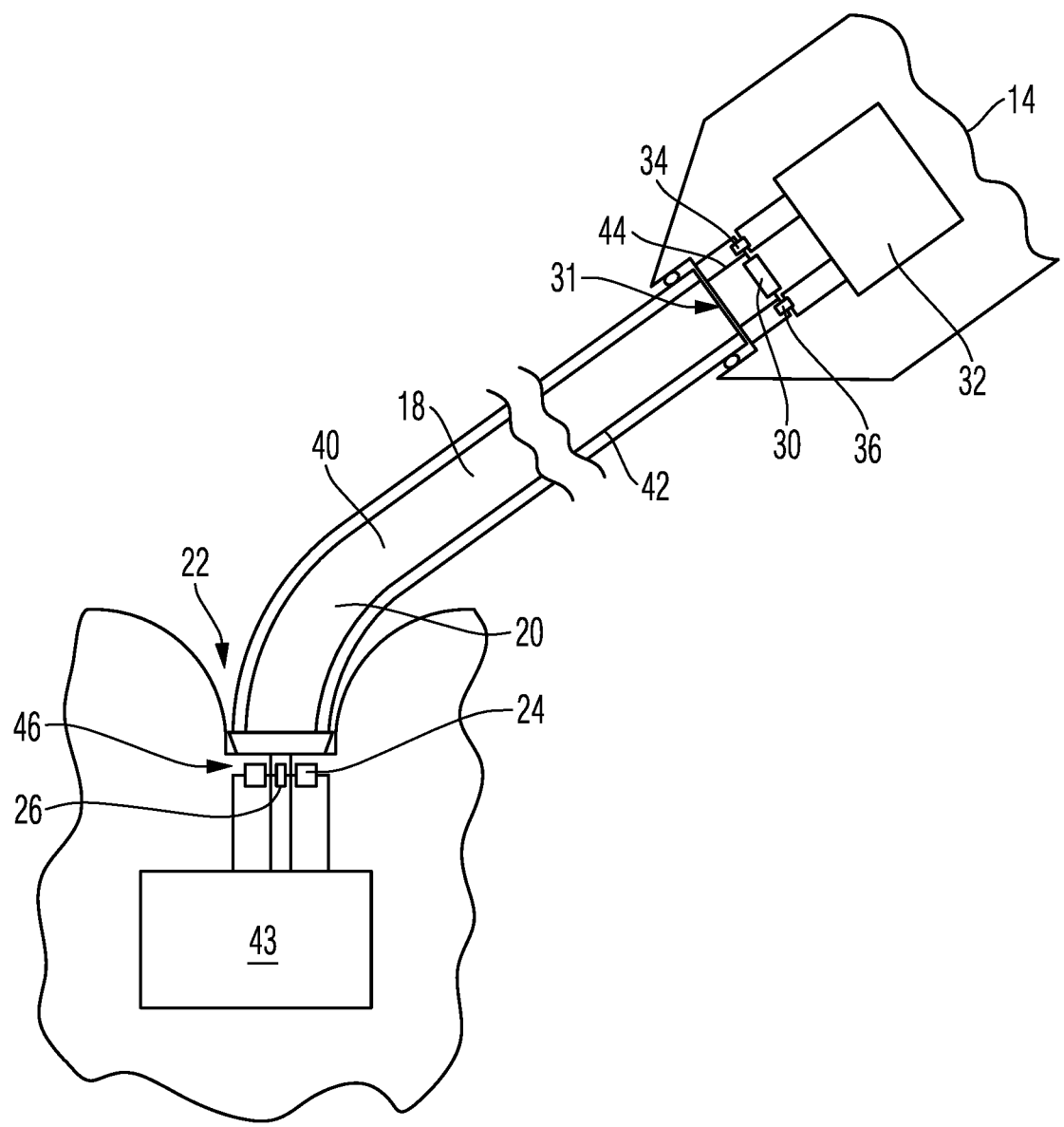
FIG. 2 shows a schematic illustration of the light sources and light sensors of the light curing device according to FIG. 1.

From FIG. 2 it becomes apparent that in the handpiece the main light source 30 is arranged centrally, so that it symmetrically impinges on the light guiding rod 18 and centrally impinges on the light entry surface 31. A reflector (not illustrated) simultaneously serves as a shielding to lateral light. The main light source 30 is driven by a control device 32.

At the outer circumference of the light guiding rod 18, i.e. adjacent to the rearward end thereof and adjacent to the light entry surface 31, first light sensors 34 and 36 are arranged within the handpiece 14, namely on the same printed circuit board compared to the main light source 30. It is to be understood that the illustration is only exemplary, and there can be arranged 1 to 4 or for example also 8 light sensors in any suitable manner. The light sensors 34 and 36 are destined to detect the radiation emitted from the second light source 24.

As can be seen schematically from FIG. 2, the second light source 24 is substantially built up in a circular ring-shaped manner or preferably consists of several, for example three or four LED chips at the outer circumference of the light guide.

This arrangement ensures that a predominant part of the emitted light radiation is fed to the light sensors 34 and 36 through the light guide 18.

Contrary thereto, the second light sensor 26 is arranged centrally in the recess 22 such that it predominantly is impinged by the light radiation of the main light source.

As it becomes schematically evident from FIG. 2, the optical fibers of the light guiding rod 18 are bundled together. A central bundle 40 is destined to emit the emitted light power of the main light source 30 and to feed the power to the front end 20 of the light guiding rod 18. Contrary thereto, secondary bundles 42 are arranged at the edge of the light guiding rod 18, wherein—even if this does not become apparent from FIG. 2—the distribution is selected so that for example 90% of the area of the light guiding rod 18 is covered by the central bundle 40.

The second light sources 24 are notedly weaker than the main light source 30, but are sufficiently strong in order to enable a safe communication with the light sensors 34 and 36, upholding or maintaining a sufficient signal-to-noise ratio. The sensors 34, 36 and the second light sources 24 are in contact with a second control device 43 in the base station.

From FIG. 2 it further becomes apparent that shielding walls 44 are provided at the light entry end of the light guiding rod 18 in the handpiece, and shielding walls 46 at the second light source 24 and the second light sensor 26. These serve to avoid a lateral light impingement, i.e. for example immediately from the second light source 24 to the second light sensor 26, wherein additionally with the aid of various carrier frequencies, a discrimination of the signals is provided.

The invention claimed is:

1. A light curing device comprising;
a handpiece comprising a light source (30) and a light guiding device with a light entry surface (31) that extends next to the light source (30), and with at least one sensor (36) that is arranged next to the light entry surface (31), and with a control device (32) that is arranged within a handpiece (14) of the light curing device (10), and
a base station (12) of the light curing device (10), characterized in that the base station (12) is provided with a second light source (24) and a second light sensor (26) for the bidirectional optical communication with the handpiece (14), which bidirectional communication takes place through the light guiding device.

2. The light curing device according to claim 1, characterized in that the second light source (24) and the second light sensor (26) are arranged next to one another at or in the base station (12).

3. The light curing device according to claim 2, characterized in that the second light source (24) and the second light sensor (26) are arranged from each other at a distance of less than 2 cm.

4. The light curing device according to claim 1, characterized in that the light source (30) and the light sensor (34, 36) are arranged within the handpiece (14) next to one another, and in that an optical shielding (44) between the light sensor (34, 36) and the light source (30) is arranged that extends from a region between the light sensor and the light source to a direction towards the light entry surface (31) of the light guiding device.

5. The light curing device according to claim 4, characterized in that the second light sensor (26) and the second light source (24) are arranged next to one another in or at the base station (12), and a second optical shielding (46) extends between a region between them and a transparent cover plate or covering foil therefor.

6. The light curing device according to claim 4, characterized in that the light source (30) and the light sensor (34, 36) are arranged on the same printed circuit board.

7. The light curing device according to claim 1, characterized in that the second light source (24) and the second light sensor (26) at the base station (12) are arranged within a recess (22) that is configured to receive the front end (20) of the light guiding device.

8. The light curing device according to claim 1, characterized in that the light guiding device comprises optical fibers having a first bundle (40) of which feeds light from the light source (30) to the second light sensor (26), and a second bundle (42) of which feeds light from the second light source (24) to the first light sensors (34, 36).

9. The light curing device according to claim 1, characterized in that handpiece (14) inserted at or into the base station (14) provides optical contact of the front end (20) of the light guiding device with the second light source (24) and the second light sensor (26).

10. The light curing device according to claim 1, characterized in that the base station (12) comprises an operating or control element that can be actuated manually of which additional functions that are not available in the handpiece (14) can be triggered during an optical separation between the handpiece (14) and the base station (12).

11. The light curing device according to claim 10, characterized in that the operating or control element comprises a trigger button, with the help of which additional functions that are not available in the handpiece (14) in case of an optical separation between the handpiece (14) and the base station (12), can be triggered.

12. The light curing device according to claim 1, characterized in that the base station (12) comprises a second control device (43) that parameterizes the first control device (32) and the handpiece (14), for one or more of setting a volume of an acoustic output element of the handpiece (14), and detecting operating hours of the handpiece (14).

13. The light curing device according to claim 1, characterized in that a second control device (43) in the base station (12) identifies the handpiece (14) that is in optical communication connection with the base station (12), and distinguishes between individual handpieces (14) and controls them separately.

14. The light curing device according to claim 1, characterized in that a second control device (43) in the base station (12) comprises an internet connection via which an antivirus program for the handpiece (14) and/or the base station (12) can be updated, and in that the antivirus program in the base station (12) periodically checks the handpiece (14) and the base station (12).

15. The light curing device according to claim 1, characterized in that a second control device (43) in the base station (12) executes an update of an operating system or other service functions in the handpiece (14).

16. The light curing device according to claim 1, characterized in that the first control device (32) in the handpiece (14) verifies a cross-check and/or an additional check with respect to an entitlement to a second control device (43) in the base station (12) to perform changes to the programming of the handpiece (14), and rejects the changes if entitlement to the second control device is lacking.

17. The light curing device according to claim 1, characterized in that the base station (12) comprises a wireless charge function for an accumulator of the handpiece (14).

18. The light curing device according to claim 1, characterized in that the bidirectional optical communication takes place via the main light source (30) of the handpiece (14) in a frequency wavelength range that is between 400 nm and 520 nm, and/or in a secondary wavelength range that comprises waves with shorter wavelengths compared to the wavelength range of the main light source (30).

19. The light curing device according to claim 18, characterized in that the bidirectional optical communication takes place in a range of green light with aid of an LED chip that offers an additional function compared to main emission chips (30) that emit blue or ultraviolett light.

20. The light curing device according to claim 1 wherein the light guiding device comprises a light guiding rod (18))

and wherein the bidirectional communication takes place in the frequency range of visible light or UV light and in a modulated manner.

21. A light curing device comprising:
    a handpiece comprising a light source (30), at least one sensor (36), a control device (32) that is arranged within the handpiece (14) of the light curing device (10), and
    a base station (12) of the light curing device (10),
    characterized in that the base station (12) is provided with a second light source (24) and a second light sensor (26) for bidirectional optical communication with the handpiece (14), which bidirectional communication takes place in the frequency range of visible light or UV light and in a modulated manner, and in optical contact between the light source (30) and the second light sensor (26), and between the second light source (24) and the at least one light sensor (36),
    wherein the second light sensor is adjusted to a nominal power of the first light source.

* * * * *